United States Patent [19]
Vermeer

[11] Patent Number: 5,970,402
[45] Date of Patent: Oct. 19, 1999

[54] RADIO CARD

[75] Inventor: Fulps Vincentinus Vermeer, Nieuwegein, Netherlands

[73] Assignee: Lucent Technologies, Inc., Murray Hill, N.J.

[21] Appl. No.: 08/904,129

[22] Filed: Aug. 9, 1997

[51] Int. Cl.$^6$ ................................................ H04B 1/00
[52] U.S. Cl. ........................................ 455/347; 455/558
[58] Field of Search ................................ 455/66, 90, 344, 455/347, 348, 349, 550, 558, 575; 379/357, 428; 257/679

[56] References Cited

U.S. PATENT DOCUMENTS

| | | | |
|---|---|---|---|
| 5,428,190 | 6/1995 | Stopperan | 174/261 |
| 5,510,959 | 4/1996 | Derstine et al. | 361/816 |
| 5,646,635 | 7/1997 | Cockson et al. | 343/702 |
| 5,680,144 | 10/1997 | Sanad | 343/702 |

FOREIGN PATENT DOCUMENTS

WO 96/23326   8/1996   WIPO ............... H01Q 1/22

*Primary Examiner*—Nguyen Vo
*Assistant Examiner*—Makoto Aoki

[57] ABSTRACT

A radio card is disclosed that is rigid on one end and relatively flexible on the second end. The radio card's 68-pin connector and radio are mounted on the rigid end of the card, and the antenna, which is advantageously fabricated from a flexible material, is mounted on the relatively flexible end of the card. When the radio card is inserted into a PC Card slot in the wireless terminal, the rigid end (with the 68-pin connector) is inserted first. When the radio card is seated inside the wireless terminal's card slot, the flexible end of the radio card (which comprises the antenna) is flexed so that the plane of the antenna is advantageously parallel to the plane of the slot doors or housing or both of the wireless terminal. When the doors and housing of the wireless terminal adjacent to the antenna is unshielded, the antenna can radiate through the doors and housing and can exhibit favorable radio propagation characteristics. Because the radio card does not extend out of the wireless terminal's card slot, the doors to the card slot can be closed, which prevents dirt and dust from entering the wireless terminal. Furthermore, because the radio card does not extend out of the wireless terminal, neither the radio card nor the wireless terminal are unlikely to be damaged if the wireless terminal is accidentally dropped.

19 Claims, 3 Drawing Sheets

RADIO CARD

FIELD OF THE INVENTION

The present invention relates to a radio in general, and, more particularly, to a radio card that is adapted for use in portable computers and other wireless terminals.

BACKGROUND OF THE INVENTION

In the last few years it has become increasingly common for a hand-held wireless terminal (e.g., a notebook computer, a supermarket scanner, a warehouse data-entry device, etc.) to be equipped with a wireless telecommunications capability to enable the wireless terminal to transmit information to a host system, or to receive information from the host system, or both. For example, a worker in a warehouse can carry a wireless terminal to assist a host system in monitoring inventory. The host system can transmit by radio to the wireless terminal a request to the worker to check how many units of a particular item are in the warehouse. After the worker has counted the number of units the worker can enter the number into the wireless terminal, which relays the number back to the host system by radio.

Although some wireless terminals (e.g., cellular telephones, cordless telephones, etc.) are manufactured with a permanent, integrated radio, other wireless terminals (e.g., hand-held data-entry devices, notebook computers, etc.) are not. One advantage of manufacturing a wireless terminal without a permanent radio is that it enables the end-user to select a radio that is appropriate for the environment in which the wireless terminal is to operate.

The wireless terminals that are manufactured without an integrated radio are, however, usually manufactured with the capability to connect to a radio. Typically, the connection is made through an industry-standard specification that prescribes both the mechanical and electrical interface. Currently, the PCMCIA "PC Card" interface is the standard to which almost all wireless terminals are designed.

The PC Card specification prescribes a slot in the wireless terminal for receiving a credit-card-shaped radio and a 68-pin electrical connector on both the radio card and in the slot so that the radio card and the wireless terminal can share power, ground and signaling. The PC Card interface also specifies the voltage, timing, and signaling protocol on each lead of the 68-pin electrical connector.

Typically, a PC radio card has a built-in antenna for transmitting and receiving signals. FIG. 1 depicts a diagram of a top view of a typical radio card. As shown in FIG. 1, radio card 100 comprises radio 107, which is electrically connected to antenna 103 via lead 105, all of which are mounted on printed circuit board 101. Typically, lead 105 is printed on printed circuit board 101. Radio card 100 also comprises connector 109, which is the 68-pin electrical connector between radio 107 and the circuitry within the wireless terminal.

FIG. 2 depicts a diagram of a top view of wireless terminal 201 and radio card 100 when radio card 100 has been properly inserted into wireless terminal 201. FIG. 3 depicts a side view of FIG. 2. When radio card 100 is seated into wireless terminal 201, that portion of radio card 100 comprising antenna 103 typically projects out of wireless terminal 201 because it enables antenna 103 to radiate and receive signals unhindered by the housing of wireless terminal 201.

There are, however, two distinct disadvantages to having the radio card project out of the wireless terminal. First, the fact that radio card 100 extends beyond the housing of wireless terminal 201 greatly increases the likelihood that the radio card or the wireless terminal or both will be damaged if the wireless terminal is accidentally dropped and lands on radio card 100. Second, many wireless terminals have one or more doors (e.g., door 203) that cover the slot into which a PC Card is inserted. The fact that radio card 100 extends beyond the housing of wireless terminal 201 precludes the closing of door 203, which allows dirt and dust to enter the wireless terminal.

Therefore, the need exists for an improved radio card design or terminal design or both that does not increase the likelihood that the radio card or wireless terminal or both will be damaged if the wireless terminal is accidentally dropped and that does not allow dirt and dust to enter the wireless terminal. Furthermore, the improved radio card design or terminal design or both should exhibit favorable radio propagation characteristics.

SUMMARY OF THE INVENTION

A radio card manufactured in accordance with the present invention avoids some of the costs and restrictions associated with radio cards in the prior art. In particular, a radio card that is manufactured in accordance with the illustrative embodiment and that is properly inserted into a wireless terminal is unlikely to be damaged, or to damage the wireless terminal, if the wireless terminal is accidentally dropped. Furthermore, a radio card manufactured in accordance with the illustrative embodiment enables the PC slot doors of a wireless terminal to be closed while the radio card is in the wireless terminal, which prevents dirt and dust from entering the wireless terminal. And still furthermore, a radio card manufactured in accordance with the illustrative embodiment can exhibit favorable radio propagation characteristics while it is inserted in the wireless terminal.

These results can be obtained in an radio card that is rigid on one end and relatively flexible on the second end. The radio card's 68-pin connector and radio are mounted on the rigid end of the card, and the antenna, which is advantageously fabricated from a flexible material, is mounted on the relatively flexible end of the card. When the radio card is inserted into a card slot in the wireless terminal, the rigid end (with the 68-pin connector) is inserted first. When the radio card is seated inside the wireless terminal's card slot, the flexible end of the radio card (which comprises the antenna) is flexed so that the plane of the antenna is advantageously parallel to the plane of the slot doors or housing or both of the wireless terminal. When the doors and housing of the wireless terminal adjacent to the antenna is unshielded, the antenna can radiate through the doors and housing and can exhibit favorable radio propagation characteristics. Because the radio card does not extend out of the wireless terminal's card slot, the doors to the card slot can be closed, which prevents dirt and dust from entering the wireless terminal. Furthermore, because the radio card does not extend out of the wireless terminal, neither the radio card nor the wireless terminal are unlikely to be damaged if the wireless terminal is accidentally dropped.

DETAILED DESCRIPTION

Figure 1:
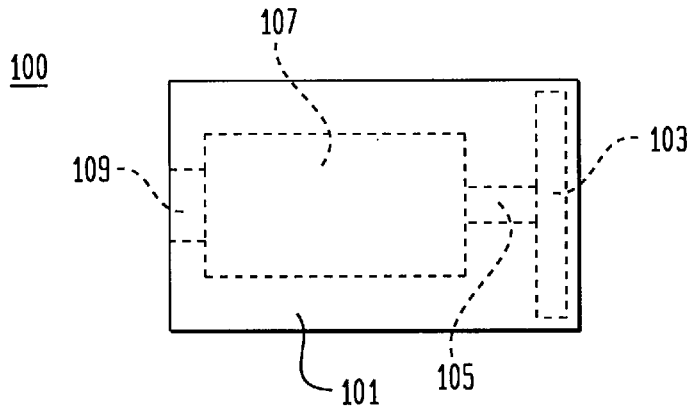
FIG. 1 depicts a top view of a radio card as known in the prior art.
Figure 2:
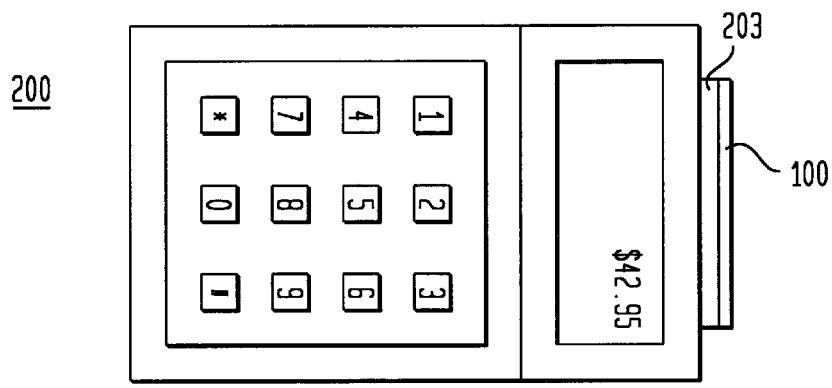
FIG. 2 depicts a top view of the radio card of FIG. 1 as it rests after being inserted into a wireless terminal.
Figure 3:
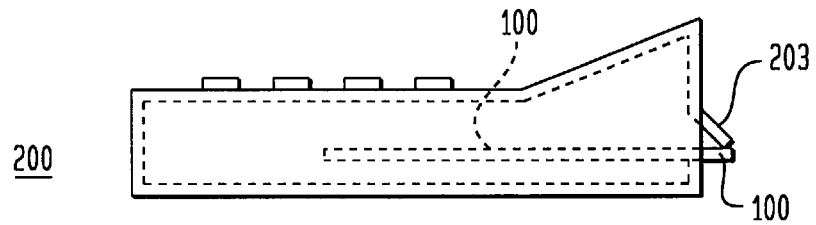
FIG. 3 depicts a side view of the radio card of FIG. 1 as it rests after being inserted into a wireless terminal.
Figure 4:
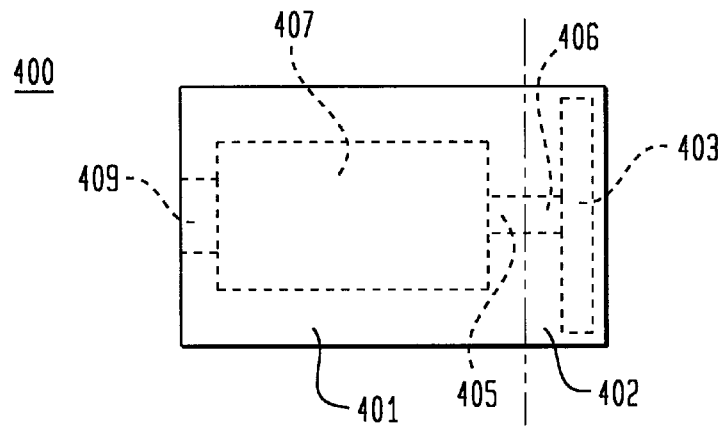
FIG. 4 depicts a top view of a radio card according to one embodiment of the present invention.

FIG. 4 depicts a top view of an PCMCIA or "PC" radio card in accordance with an illustrative embodiment of the present invention. Radio card 400 advantageously comprises a longitudinal substrate that is logically distinguishable into two ends. The first end is advantageously more rigid than the second end. The first end has a modulus of elasticity, $e_r$, and the second end has a modulus of elasticity, $e_f$. Advantageously, $e_r > e_f$.

Figure 5:
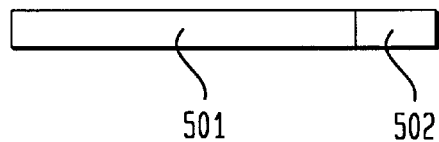
FIG. 5 depicts a side view of one illustrative substrate in the radio card of FIG. 4.
Figure 6:
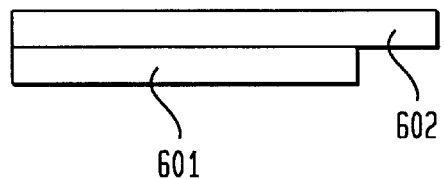
FIG. 6 depicts a side view of a second illustrative substrate in the radio card of FIG. 4.
Figure 7:
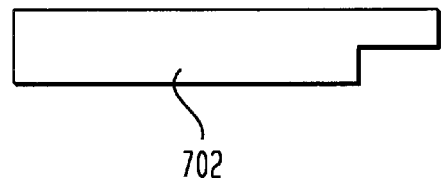
FIG. 7 depicts a side view of a third illustrative substrate in the radio card of FIG. 4

As is well-known to those skilled in the art, the substrate can be fabricated by two appropriate materials joined mechanically or chemically end-to-end (as shown in FIG. 5). Substrate 501 is made of a rigid material and composes the first end and substrate 502 is made of a more flexible material and composes the second end. Alternatively, the substrate can be fabricated by a plurality of appropriate materials joined mechanically or chemically as a sandwich (as shown in FIG. 6). Substrate 602 is made of a flexible material and is bonded to a more rigid material under the first end, in such a manner that the sandwich is more rigid on the first end than on the second end. In yet another alternative, the substrate can be fabricated from a single material that is thicker on the first end and thinner on the second end (as shown in FIG. 7), such that the thicker end is more rigid than the thinner end. For example, the substrate can comprise glass-filled epoxy wherein the first end has a thickness of at least 0.5 mm and the second end has a thickness of less than 0.15 mm. It will be understood to those skilled in the art that each of materials 501, 502, 601, 602 and 702 can itself be a composite material, such as glass-filled epoxy, or a sandwich of materials, such as a multi-layer printed circuit board. It will be clear to those skilled in the art how to make and use a substrate for radio card 400.

Referring again to FIG. 4, the substrate advantageously functions as a printed circuit board that has mounted on it radio 407, connector 409, antenna 403 and lead 405. Radio 407 and connector 409 are advantageously mounted on the first, or rigid end, of the substrate, and antenna 403 is advantageously mounted on the second, or more flexible end, of the substrate. Connector 409 is advantageously a 68-pin connector that electrically connects radio 407 to wireless terminal 501 in accordance with the PCMCIA form factor. Radio 407 is advantageously a one-way or two-way radio as is well-known in the art. Antenna 403 is advantageously flexible and flexes with the second end of the substrate. Lead 405 advantageously electrically connects antenna 403 to radio 407.

Figure 8:
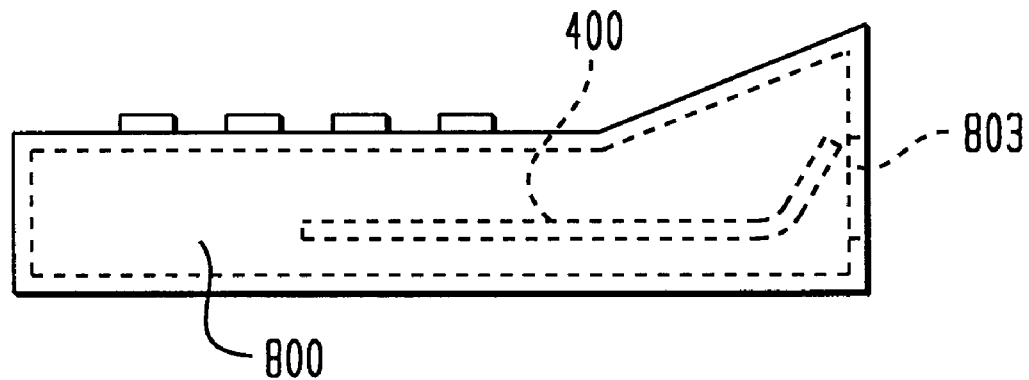
FIG. 8 depicts a side view of the radio card of FIG. 4 as it is inserted into a wireless terminal.

Radio card 400 is advantageously used with wireless terminal 800, which comprises a PCMCIA card slot in a standard form factor. Wireless terminal 800 also advantageously comprises door 803, which covers the PCMCIA card slot and prevents dirt and dust from entering wireless terminal 800. In accordance with the illustrative embodiment of the present invention, door 803 is opened to allow radio card 400 to be inserted, rigid end first, into the PCMCIA card slot in wireless terminal 800. Advantageously, door 803 is closed after radio card 400 is inserted and that causes the flexible end of radio card 400, which contains antenna 403, to flex upward (as shown in FIG. 8) or downward. When door 803 is not shielded, the flexing of the flexible end of radio card 400 places antenna 403 in an excellent position to radiate and receive signals through door 803. If the end of the radio card containing the antenna did not flex, the antenna's position would cause the antenna to radiate more energy into the electronics of the wireless terminal, rather than out into the open.

This configuration is also advantageous because radio card 400 does not project out of the housing of wireless terminal 800, and is, therefore, more resistant to damage. Furthermore, the fact that door 803 is closed prevents dirt and dust from entering wireless terminal 800.

In an alternative embodiment of the present invention, the second end of radio card 400 comprises a first antenna and a second antenna. The two antennas are used for antenna diversity purposes. In this embodiment, the first antenna is advantageously connected to radio 407 by a first lead and the second antenna is advantageously connected to radio 407 by a second lead.

Figure 9:
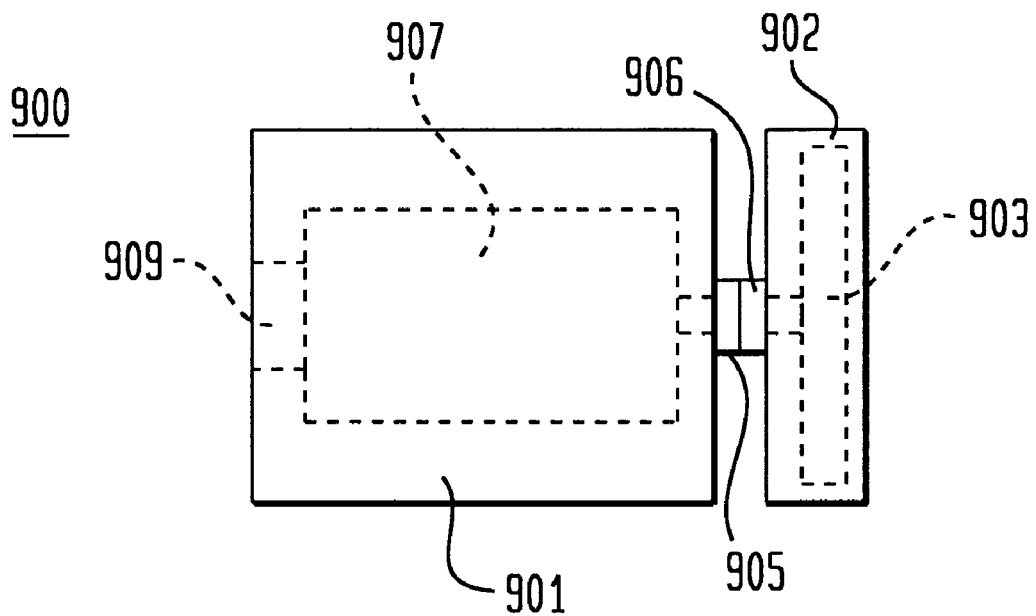
FIG. 9 depicts a top view of a radio card in which a flexible antenna is connected to a rigid substrate on which a radio is mounted.

Yet another alternative embodiment of the present invention is depicted in FIG. 9. FIG. 9 depicts radio card 900 comprising substrate 901 having a modulus of elasticity of $e_r$, substrate 902 having a modulus of elasticity of $e_f$, wherein $e_r > e_f$, radio 907 mounted on substrate 901, antenna 903 mounted on substrate 902, and detachable connector 905 for structurally supporting substrate 902 from substrate 901 and also for electrically connecting radio 907 to antenna 903. Detachable connector 905 can be, for example, a bayonet-type connector, or any other connector that provides both structural support between its parts and electrical connectivity. Advantageously, substrate 901 is a rectangular printed circuit board in conformance with the PCMCIA form factor. The advantage of this embodiment is that substrate 902 and antenna 903 can be easily detached from substrate 901 and radio 907 and replaced with another substrate and antenna, perhaps because of a change in the frequency with which radio 907 operates. Radio card 900 fits into wireless terminal 800 in the same manner as radio card 400.

It will be clear to those skilled in the art how to make and use radio card 400, radio card 900 and wireless terminal 800.

What is claimed is:

1. An apparatus comprising:
   a longitudinal substrate comprising a first end and a second end, wherein said first end has a modulus of elasticity, $e_r$, and said second end has a modulus of elasticity, $e_f$, and wherein $e_r > e_f$, and thereby capable of being repositionable fully within a housing of a wireless terminal;
   a radio mounted on said first end of said substrate;
   an antenna mounted on said second end of said substrate; and
   a lead electrically connecting said radio to said antenna.

2. The apparatus of claim 1 wherein said substrate is a printed circuit board.

3. The apparatus of claim 2 wherein said antenna is printed on said printed circuit board.

4. The apparatus of claim 3 wherein said lead is printed on said printed circuit board.

5. The apparatus of claim 1 wherein said substrate comprises glass-filled epoxy.

6. The apparatus of claim 5 wherein said first end has a thickness of at least 0.5 mm.

7. The apparatus of claim 6 wherein said second end has a thickness of less than 0.15 mm.

8. The apparatus of claim 1 wherein said substrate is rectangular.

9. An apparatus comprising:
- a longitudinal substrate comprising a first end and a second end, wherein said first end has a modulus of elasticity, $e_r$, and said second end has a modulus of elasticity, $e_f$, and wherein $e_r > e_f$, and thereby capable of being repositionable fully within a housing of a wireless terminal;
- a radio mounted on said first end of said substrate;
- a first antenna and a second antenna mounted on said second end of said substrate;
- a first lead electrically connecting said radio to said first antenna; and
- a second lead electrically connecting said radio to said second antenna.

10. The apparatus of claim 9 wherein said substrate is a printed circuit board.

11. The apparatus of claim 10 wherein said first antenna and said second antenna are printed on said printed circuit board.

12. The apparatus of claim 11 wherein said first lead and said second lead are printed on said printed circuit board.

13. The apparatus of claim 9 wherein said substrate comprises glass-filled epoxy.

14. The apparatus of claim 13 wherein said first end has a thickness of at least 0.5 mm.

15. The apparatus of claim 14 wherein said second end has a thickness of less than 0.15 mm.

16. The apparatus of claim 9 wherein said substrate is rectangular.

17. A radio card comprising:
- a first substrate having a modulus of elasticity of $e_r$;
- a second substrate having a modulus of elasticity of $e_f$; wherein $e_r > e_f$ and thereby capable of being repositionable fully within a housing of a wireless terminal;
- a radio mounted on said first substrate;
- an antenna mounted on said second substrate; and
- a detachable connector for structurally supporting said second substrate from said first substrate and also for electrically connecting said radio to said antenna.

18. The apparatus of claim 17 wherein said first substrate is a printed circuit board.

19. The apparatus of claim 17 wherein said first substrate is rectangular.

\* \* \* \* \*